United States Patent [19]

Claassen

[11] Patent Number: 4,811,863
[45] Date of Patent: Mar. 14, 1989

[54] APPARATUS FOR LIQUEFYING A THERMOPLASTIC PLASTIC

[76] Inventor: Henning J. Claassen, Industriegebiet Hafen, 2120 Lüneburg, Fed. Rep. of Germany

[21] Appl. No.: 137,313

[22] Filed: Dec. 23, 1987

[30] Foreign Application Priority Data

Jan. 26, 1987 [DE] Fed. Rep. of Germany ....... 3702160

[51] Int. Cl.⁴ ............................................. B67D 5/62
[52] U.S. Cl. .................................. 222/146.5; 222/80; 219/421; 219/422; 126/343.5 A
[58] Field of Search .................. 222/80, 146.2, 146.5, 222/325; 219/420, 421, 422; 432/13, 210; 126/343.5 R, 343.5 A

[56] References Cited

U.S. PATENT DOCUMENTS

| 2,544,661 | 3/1951 | Fossa | 126/343.5 A |
| 3,011,042 | 11/1961 | Kamborian | 222/146.5 X |
| 3,197,076 | 7/1965 | Chamblee | 126/343.5 A X |
| 3,352,279 | 11/1967 | Lockwood | 219/421 X |
| 4,178,876 | 12/1979 | Nicklas et al. | 222/146.5 X |
| 4,308,447 | 12/1981 | Nötzold et al. | 219/421 |
| 4,474,311 | 10/1984 | Petrecca | 126/343.5 R X |
| 4,505,669 | 3/1985 | Rogers | 222/146.5 X |
| 4,641,764 | 2/1987 | Faulkner, III | 222/146.2 |
| 4,666,066 | 5/1987 | Boccagno et al. | 219/421 X |
| 4,706,849 | 11/1987 | Ryan | 222/80 |
| 4,724,983 | 2/1988 | Claassen | 222/146.5 |

Primary Examiner—Kevin P. Shaver
Attorney, Agent, or Firm—Armstrong, Nikaido, Marmelstein & Kubovcik

[57] ABSTRACT

An apparatus for liquefying a thermoplastic plastic, in particular an adhesive on the basis of polyurethane, comprises a heatable sealed supply container having an upper portion for receiving a downwardly open transport container for the thermoplastic plastic and a lower portion serving as buffer volume, a heating means for heating the thermoplastic plastic disposed in the transport container, a base portion arranged beneath the supply container and thus beneath the transport container and accommodating a collecting trough for the liquefied thermoplastic plastic and a cover at the upper end of the supply container. In addition, a heating device, either a heat radiator or a contact heating means, is integrated into the cover to heat the bottom of the transport container and thus increase the discharge rate.

Expediently, a resiliently mounted heating plate which comes to bear on the bottom of the transport container is provided in the cover.

6 Claims, 1 Drawing Sheet

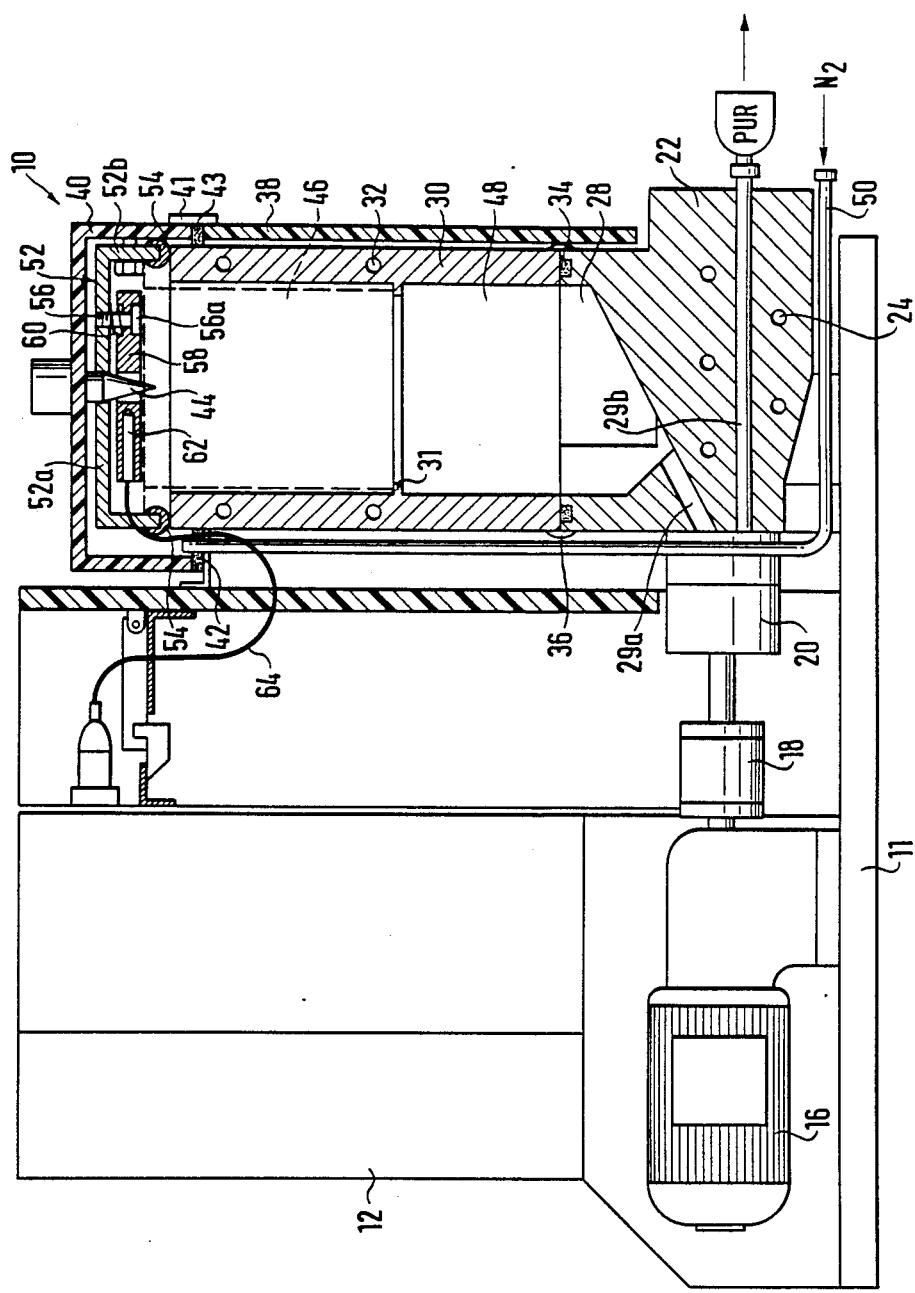

APPARATUS FOR LIQUEFYING A THERMOPLASTIC PLASTIC

BACKGROUND OF THE INVENTION

1. Field of the Invention

The invention relates to an apparatus for liquefying a thermoplastic plastic, in particular an adhesive on the basis of polyurethane.

2. Description of the Prior Art

In such a liquefying apparatus as is known from U.S. Pat. No. 4,724,983 a heatable sealed supply container comprises an upper portion for receiving a downwardly open transport container for the thermoplastic plastic and a lower portion serving as buffer volume. A heating means integrated into the side walls of the supply container heats the thermoplastic plastic disposed in the transport container so that said plastic becomes liquid and drops into a base portion arranged in the supply container beneath the transport container and accomodating a collecting trough for the liquefied thermoplastic plastic. At the upper end of the supply container a pivotally formed cover is attached which is provided at its inner side with a mandrel; when the cover is closed the tip of the mandrel penetrates into the upwardly directed face of the transport container and thereby assists the flowing of the liquefied plastic out of the transport container.

Via a conduit an inert gas, usually serving as protective gas, can be supplied to the interior of the supply container.

In tests with such a liquefying apparatus it has however been found that the discharge speed of the molten plastic from the transport container is low so that the necessary amount of liquefied plastic is not made available reliably. In addition, reductions in the quality of the liquefied plastic can occur.

SUMMARY OF THE INVENTION

The invention is thus based on the problem of providing an apparatus for liquefying a thermoplastic plastic, in particular an adhesive on the basis of polyurethane, of the type mentioned above in which the aforementioned advantages do not occur. In particular, a liquefying apparatus is to be proposed which ensures optimum discharge rates of the molten plastic from the transport container.

In an apparatus for liquefying a thermoplastic plastic, in particular an adhesive on the basis of polyurethane, comprising (a) a heatable sealed supply container having an upper portion for receiving a downwardly open transport container for the thermoplastic plastic and a lower portion serving as buffer volume, (b) a heating means for heating the thermoplastic plastic disposed in the transport container, (c) a base portion disposed beneath the supply container and accommodating a collecting trough for the liquefied thermoplastic plastic, and (d) a cover at the upper end of the supply container, the invention therefore proposes the improvement that (f) a heating means for the bottom of the transport container is integrated into the cover of the supply container.

Expedient embodiments are defined by the features of the subsidiary claims.

The advantages achieved with the invention are due to the fact that the transport container and thus the still solid thermoplastic plastic disposed therein is specifically heated both from the side and from above, i.e. from the bottom of the transport container, so that a substantially higher melting power and thus an increase in the speed with which the molten plastic flows out of the transport container is obtained. Simultaneously, by matching the heating power for the side walls and for the bottom of the transport container a very uniform melting of the plastic can be achieved, considered over the entire volume of the plastic in the transport container, so that the molten plastic has very homogeneous properties and in particular no reductions in quality occur as arise with irregular heating.

Although the heating of the bottom of the transport container can fundamentally also be contactless, for example via infrared radiators, according to a preferred embodiment a contact heating is used by integrating an aluminum sheet or plate into the pivotal cover of the supply container. Said aluminum plate is provided with a plurality of bores in which electrical resistance conductors or heating conductors insulated for example by means of fireclay tubes are disposed.

The resistance conductors extend expediently from the outside to the inside and are arranged at equal angular intervals; for example, if three resistance conductors are used they are spaced an angular distance of 120° apart from each other with respect to a disc-shaped heating plate.

In conventional transport containers fluctuations in the dimensions may occur; to ensure nevertheless the optimum contact face between the heating and the bottom of the transport container the heating plate should be mounted resiliently and biased for movement towards the bottom of the transport container. This ensures that even with different lengths of the transport container the heating plate bears reliably on the bottom of the container and thus also ensures good heat transfer.

According to a preferred embodiment the actual, pivotally mounted cover is provided at its inner side with a special steel bell which is connected via stud bolts or threaded journals rotatably, i.e., pivotally, to the cover. This ensures the reliable sealing engagement of the lower edges of the side walls of said special steel bell on the upper edges of the side walls of the supply container.

Secured to the inner side of the special steel bell are a plurality of downwardly projecting stud bolts which extend through bores in the heating plate. The stud bolts are provided at their lower ends with collars which are accommodated in corresponding countersunk depressions in the lower face of the heating plate and thereby serve as support for the heating plate.

The stud bolts are surrounded by helical springs which serve as pressure springs and which are arranged between the lower side of the special steel bell and a counter member of the heating plate. The heating plate is thereby urged downwardly but can be pushed somewhat upwardly, for example by a longer transport container.

BRIEF DESCRIPTION OF THE INVENTION

The invention will be explained hereinafter in detail with the aid of an example of embodiment with reference to the attached schematic drawing, the single FIGURE of which shows a vertical section through an apparatus for liquefying an adhesive on the basis of polyurethane.

DESCRIPTION OF THE PREFERRED EMBODIMENT

The liquefying apparatus denoted generally by the reference numeral 10 comprises a base plate 11 which carries an electric motor 16, a control box 12 which accommodates the electrical switch elements for controlling the temperature at the various heating elements, and on the right side of the illustration in the Figure carries the actual liquefying part. The electric motor 16 via a coupling, in particular a magnetic coupling, or a gearing, generally a reduction gearing, which are indicated by the reference numeral 18, drives a pump 20, generally a gear-type pump, for conveying the heated and thus liquefied polyurethane adhesive.

The actual liquefying part is disposed in a heat-protection hood 38 which also screens the sensitive electronic components of the control box 12 and is sealed at its upper end by a pivotally mounted cover 40. For sealing the gap between the cover 40 and the lower region of the liquefying part seals 43 and 42 are provided. Moreover, a schematically indicated latch means 41 is provided and holds the cover 40 in its operating position shown in the Figure.

The actual liquefying part comprises a block-shaped substructure 22 with heating bores 24 in which electrical resistance heating elements insulated for example by means of fireclay or chamotte tubes are disposed.

At the upper end the block 22 comprises a recess 28 formed as collecting trough and connected via a passage 29a to the pump 20. From the pump 20 a further portion 29b of the conveying passage leads to the outlet for the liquefied adhesive.

By brackets 36 the actual supply container 30 is detachably secured on the block 22, and the walls of said container 30 are likewise provided with heating bores 32 in which for example electrical resistance heating elements insulated by means of chamotte tubes are disposed.

Between the upper edge of the walls of the block 22 in the region of the recess 28 and the lower edge of the walls of the supply container 30 seals 34 are provided, in particular insulations on the basis of mineral fibres, expediently asbestos.

As is apparent from the Figure the two upper seals 43 and 42 bear on the outer wall of the upwardly open supply container 30.

The supply container 30 comprises two parts, that is a lower buffer volume 48 and an upper part which is separated from the lower part 48 by a narrow encircling web 31 projecting inwardly from the inner wall thereof. Resting on said web is the lower edge of a downwardly open transport container 46 for the adhesive which is indicated in the Figure by dashed lines.

The inner edge of the cover 40 is provided with a downwardly projecting pointed mandrel 44 whose tip penetrates into the upwardly directed bottom face of the transport container 46.

A conduit 50 for an inert gas, in particular nitrogen, extends through beneath the block and then laterally past the supply container 30 upwardly and opens into the cavity which is formed between the upper end of the supply container 30 and the cover 40.

In the pivotally mounted cover 40 there is a special steel bell 52 which is adapted to the inner contour of the cover 40 and connected via horizontal stud bolts 54 to the cover 40. As stud bolts for example threaded pins or studs 54 may be used. As a result the special steel bell 52 is mounted rotatably or pendulously in the cover 40.

As apparent from the Figure the special steel bell 52 comprises a horizontal plate-shaped cover portion 52a from which side portions 52b project downwardly and form a sort of apron-like edge which bears tightly on the upper edges of the supply container 30.

Secured to the lower side of the cover portion 52a of the special steel bell 52 is a plurality of stud bolts 56 which project perpendicularly downwardly and at their lower ends are provided with collars 56a. In the Figure only a single stud bolt 56 is shown. Generally at least three stud bolts 56 are provided.

A heating plate 58 of aluminum, which generally has a disc shape, comprises bores which correspond in number to the number of stud bolts 56 and the inner diameter of which is somewhat greater than the outer diameter of the stud bolts 56. At their lower end the bores merge into a countersunk portion in which the collars 56a of the stud bolts are received.

The stud bolts 56 are thus inserted through the bores of the heating plate 58 and then secured to the inner face of the special steel bell 52, for example screwed in, so that the collars 56a of the stud bolts 56 penetrate into the countersunk portions in the heating plate 58. As a result the heating plate rests on the collars 56a which serve as stop for the movement of the heating plate 58 downwardly.

Helical springs 60 serving as pressure springs are slipped over the stud bolts 56 and are clamped between the lower side of the special steel bell 52 and a counter face at the heating plate 58, i.e. press the heating plate 58 resiliently downwardly.

Both the heating plate 58 and the special steel bell 52 have a passage for the mandrel 44 so that the tip thereof can project downwardly beyond the heating plate 58.

The heating plate 58 comprises bores which extend in the horizontal direction and in which, for example, electrical resistance heating elements 62 insulated by means of chamotte tubes are disposed. Said resistance heating elements 62 are connected via a lead 64 to the control box 12 which provides them with the necessary power.

When the operation is started the cover 40 is opened and a trnsport container 46 for the adhesive on the basis of polyurethane, which is open at one side, is introduced into the supply container 30 with the opening downwards so that the lower edge of the transport container 46 comes to rest on the encircling web 31. The adhesive on the basis of polyurethane is so viscous that it cannot flow out of the downwardly opened transport container 46.

The cover 40 is then closed so that the tip of the mandrel 44 penetrates from above into the transport container 46. At the same time the gaps between the cover 40 on the one hand and the heat-protection hood 38 or the supply container 30 resp. on the other hand are sealed by means of the seals 43, 42. Nitrogen is then supplied via the conduit 50 so that the air is expelled from the supply container and the collecting trough, i.e. the adhesive can no longer come into direct contact with the ambient air.

The two independently controllable heating devices for the block 22 on the one hand and the supply container 30 on the other as well as for the heating plate 58 are now switched on. As a result the adhesive in the transport container 46 is heated from the side and from the bottom of the transport container 46 so that it liquefies and flows downwardly out of the transport container 46 into the buffer volume 48. By the resilient mounting of the heating plate 58 it is ensured that said plate bears on the bottom of the transport container 46 even when the various transport containers 46 employed have different lengths.

The power supplied to the resistance heating elements 62 in the heating plate 58 can be adapted in dependence upon the temperature regulation in the supply container 30 and in the block 22 to ensure uniform heating of the transport container 46 and thus of the polyurethane disposed in the transport container 46 from all sides.

As described in U.S. Pat. No. 4,724,983 the portion 48 of the supply container serves as buffer volume and suffices to accommodate an amount of adhesive corresponding to the largest transporter container volume to be processed. From the buffer volume the liquefied adhesive passes via the recess 28 serving as collection trough and the passage 29a to the pump 20 which supplies the liquefied adhesive via the passage 29b to the outlet.

Although hitherto a pure "contact heating" has been described for the bottom of the transport container 46 the heating of the bottom of said container 46 can also be carried out in another manner, for example via a heat radiator, for example an infrared radiator, which is integrated in the cover 40.

I claim:

1. An apparatus for liquefying a polyurethane based thermoplastic plastic adhesive comprising:

(a) a heatable sealed supply container having an upper portion for receiving a downwardly open transport container for the thermoplastic plastic adhesive and a lower portion serving as buffer volume,
   (b) a first heating means for heating the thermoplastic plastic adhesive disposed in the transport container,
   (c) a base portion disposed beneath the supply container and accommodating a collecting trough for the liquefied thermoplastic plastic adhesive,
   (d) a cover at the upper end of the supply container, and
   (e) a resiliently mounted heating plate disposed at the inner surface of the cover of the supply container.

2. An apparatus according to claim 1, wherein a bell is movably mounted on the cover via stud bolts and the heating plate is resiliently secured to the inner side of said bell.

3. An apparatus according to claim 2, wherein both the bell and the heating plate have a passage for a mandrel attached to the inner side of the cover.

4. An apparatus according to claim 2, wherein the bell and the heating plate are resiliently connected to each other via a bolt and spring arrangement.

5. An apparatus according to claim 1, wherein the heating plate comprises bores for resistance heating elements.

6. An apparatus according to claim 5, wherein the bores extend from the outside to the inside of the heating plate and are arranged at equal intervals apart.

* * * * *